3,249,496
SOIL FUNGICIDE
Marvin L. Oftedahl, Crestwood, Mo., assignor to Monsanto Company, St. Louis, Mo., a corporation of Delaware
No Drawing. Filed June 14, 1965, Ser. No. 463,948
2 Claims. (Cl. 167—30)

This invention relates to a new and useful soil fungicidal agent.

In accordance with this invention it has been found that 3,4-dichloro-N-methyl-N-nitrosoaniline

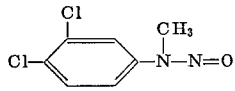

which melts at about 47° C., is useful in the control of Rhizoctonia upon contact therewith. Rhizoctonia is a genus of soil-borne pathogenic fungal organisms that inhabit the soil throughout the word, strains of which invade and kill the young plant roots of many kinds of cultivated plants from pea plant to pine trees as well as invade and kill certain kinds of beneficial soil fungi.

To illustrate this invention but not limitative thereof is the following:

An intimate mixture of two volumes of yellow corn meal and three volumes of white sand is infested with *Rhizoctonia solani* and incubated for two weeks at 20° C. Then one volume of this infested mixture is blended uniformly with three volumes of a good grade of top soil which had been sterilized. To accomplish complete blending the composite of soil and the infested mixture is passed through a No. 8 screen three times. Four small cups are then packed, respectively, with thirty grams of the composite and the surface thereof leveled.

3,4-dichloro-N-methyl-N-nitrosoaniline is dissolved in sufficient acetone to make a one percent by weight solution thereof and then diluted with water to provide a formulation having a concentration of thirty parts per million of the said compound. To the surface of the soil of two of the aforesaid small cups is added, respectively, four millimeters of the said formulation so as to drench same. Nothing is added to the other two small cups. The four cups are then placed in a 100 percent humidity chamber at 70° C. for forty-four hours. Upon removal from the chamber no mycelial growth was observed on the surface of the soil in the respective small cups treated with 3,4-dichloro-N-methyl-N-nitrosoaniline while the surface of the soil in the respective small cups which were not treated was completely covered with mycelial growth.

The new fungicidal agent of this invention is non-phytotoxic. For example, cotton was planted in a *Rhizoctonia solani* infested soil and after about three to four weeks of growth the soil was drenched with an aqueous dispersion of 3,4-dichloro-N-methyl-N-nitrosoaniline (concentration of fifty parts per million) sufficient to destroy the fungus present but with no sign of damage to the above surface growth of the cotton plant upon later inspection thereof.

Although 3,4-dichloro-N-methyl-N-nitrosoaniline is useful per se in controlling Rhizoctonia by contacting same therewith, it is usually applied to the surface of the soil or incorporated in the soil in admixture with an inert carrier in the form of dusts, sprays or drenches. The amount of the new fungicidal agent employed will vary depending upon the particular fungal organism, the growth stage of the plant, the manner of application, etc., but in general an application rate of from about 10 to 50 pounds per acre of 3,4-dichloro-N-methyl-N-nitrosoaniline will provide a fungicidally toxic amount.

The new fungicidal agent can be used, additionally, as seed treatment on seeds such as corn, peanuts, cotton, sorghum, and the like, for protection thereof while germinating from attack by soil-borne pathogens of the genus Rhizoctonia, for example by spraying on aqueous dispersion thereof over an acre of open furrows containing seeds (for example and in particular cotton seeds) at a rate of 2 to 5 pounds per 12,000 feet of row so as to strike the sides and bottoms of the furrow and thereafter closing the furrow. Treatment of cotton seeds at the rate of 4 to 6 ounces of the new fungicidal agent per 100 pounds of cotton seed provides an effective protectant from attack by Rhizoctonia.

The fungicidal agent of this invention can be dispersed by suitable method (e.g., tumbling or grinding) in solid extending agents either of organic or inorganic nature and supplied to the fungal organism's environment in particulate form. Such solid materials include for example, tricalcium phosphate, calcium carbonate, kaolin, bole, kieselguhr, talc, bentonite, fuller's earth, pyrophyllite, diatomaceous earth, calcined magnesia, volcanic ash, sulfur and the like inorganic solid materials, and include, for example, such materials of organic nature as powdered cork, powdered wood, and powdered walnut shells. The preferred solid carriers are the adsorbent clays, e.g. bentonite. These mixtures can be used for fungicidal purposes in the dry form, or, by addition of water-soluble surfactants or wetting agents the dry particulate solids can be rendered wettable by water so as to obtain stable aqueous dispersions or suspensions suitable for use as sprays or drenches. Other dispersions can be provided in a concentrated form suitable for mixing with or dispersing in other extending agents. As illustrative of a particularly useful concentrate is an intimate mixture of the fungicidal agent of this invention with a water-soluble surfactant which lowers the surface tension of water in the weight proportions of 0.1 to 15 parts of surfactant with sufficient of the fungicidal agent of this invention to make 100 parts by weight. Such a concentrate is particularly adapted to be made into a spray or drench for combating various forms of Rhizoctonia by the addition of water thereto. As illustrative of such a concentrate is an intimate mixture of 95 parts by weight of 3,4-dichloro-N-methyl-N-nitrosoaniline and 5 parts by weight of a water-soluble non-ionic surfactant such as the polyoxyethylene derivative of sorbitan monolaurate.

Another useful concentrate adapted to be made into a spray of dranch for combatting Rhizoctonia is a solution (preferably as concentrated as possible) of the fungicidal agent of this invention in an inert organic solvent therefor. The said liquid concentrate preferably contains dissolved therein a minor amount (e.g., 0.5 to 10 percent by weight of the weight of the new fungicidal agent) of a surfactant (or emulsifying agent), which surfactant is also water-soluble. As illustrative of such a concentrate is a solution of 3,4-dichloro-N-methyl-N-nitrosoaniline in acetone which solution contains dissolved therein a water-soluble polyoxyethylene glycol non-ionic surfactant.

The compound of this invention can also be advantageously employed in combination with other pesticides, including, for example, insecticides, nematocides, bactericides, and herbicides. In this manner it is possible to obtain mixtures which are effective against a wide variety of pests and other forms of noxious life.

In controlling or combating Rhizoctonia the fungicidal agent of this invention either per se or compositions comprising same are supplied to the fungal organisms or to their environment in a fungicidally toxic amount. This can be done by dispersing the new fungicidal agent or fungicidal composition comprising same in, one or over an infested environment or in, on or over an environment the fungal organisms frequent, e.g. agricultural soil or other growth media or other media infested with the fungal organisms or attractable to the organisms for habitational or sustenance or propagational purposes, in any conventional fashion which permits contact between the organisms and the fungicidal agent of this invention. Such dispersing can be brought about by applying the fungicidal agent per se or sprays or drenches or particulate solid compositions containing same to a surface or sub-surface infested with the fungal organisms or attractable to the organisms, by any of the conventional methods, e.g. power dusters, loom and hand sprayers, and spray dusters. Also for sub-surface application such dispersing can be carried out by simply mixing the new fungicidal agent per se or fungicidal spray or drench or particulate solid compositions comprising same with the infested environment or with the environment the fungal organisms frequent, or by employing a liquid carrier for the new fungicidal agent to accomplish sub-surface pentration and impregnation therein.

What is claimed is:

1. The method of destroying fungal organisms of the genus Rhizoctonia which comprises contacting said fungal organisms with a fungicidally toxic amount of 3,4-dichloro-N-methyl-N-nitrosoaniline.

2. The method of destroying the fungal organism species *Rhizoctonia solani* which comprises contacting said fungal organism with a fungicidally toxic amount of 3,4-dichloro-N-methyl-N-nitrosoaniline.

References Cited by the Examiner
FOREIGN PATENTS 1,071,409   12/1959   Germany.

JULIAN S. LEVITT, *Primary Examiner.*

STANLEY J. FRIEDMAN, *Assistant Examiner.*